(12) United States Patent
Darrow et al.

(10) Patent No.: US 8,535,784 B2
(45) Date of Patent: Sep. 17, 2013

(54) CONTOURED COMPOSITE PARTS

(75) Inventors: Donald C. Darrow, Grand Prairie, TX (US); Michael R. Anderson, Renton, WA (US); Michael A. Lee, Kent, WA (US); Kurtis S. Willden, Kent, WA (US)

(73) Assignee: The Boeing Company, Chicago, IL (US)

( * ) Notice: Subject to any disclaimer, the term of this patent is extended or adjusted under 35 U.S.C. 154(b) by 19 days.

(21) Appl. No.: 13/412,568

(22) Filed: Mar. 5, 2012

(65) Prior Publication Data

US 2012/0171410 A1 Jul. 5, 2012

Related U.S. Application Data

(62) Division of application No. 11/971,766, filed on Jan. 9, 2008, now Pat. No. 8,152,948.

(51) Int. Cl.
*B32B 1/00* (2006.01)
*B32B 3/00* (2006.01)

(52) U.S. Cl.
USPC ......... 428/174; 442/239; 442/246; 244/117 R

(58) Field of Classification Search
USPC ..... 428/174, 166; 442/239, 246; 244/117 R, 244/119, 120
See application file for complete search history.

(56) References Cited

U.S. PATENT DOCUMENTS

| 4,606,961 | A | 8/1986 | Munsen et al. |
| 5,843,355 | A | 12/1998 | McCarville et al. |
| 7,045,084 | B1 | 5/2006 | Reis et al. |
| 2003/0068472 | A1 | 4/2003 | Benson |
| 2006/0249868 | A1 | 11/2006 | Brown et al. |
| 2007/0029038 | A1 | 2/2007 | Brown et al. |

FOREIGN PATENT DOCUMENTS

| DE | 19825402 C1 | 2/2000 |
| EP | 0 373 729 A | 6/1990 |
| EP | 1 800 840 A | 6/2007 |
| JP | 2001038752 A | 2/2001 |

OTHER PUBLICATIONS

European Examination Report dated Apr. 19, 2012, EPO form 2906.

*Primary Examiner* — Catherine A Simone
(74) *Attorney, Agent, or Firm* — Klintworth & Rozenblat IP LLC

(57) ABSTRACT

One embodiment of a composite part comprises a curved elongated section comprising a plurality of stacked reinforcement layers. The stacked reinforcement layers in the curved elongated section comprise at least one of non-continuous woven fabric and non-continuous reinforcement.

20 Claims, 12 Drawing Sheets

CONTOURED COMPOSITE PARTS

CROSS-REFERENCES TO RELATED APPLICATIONS

The present application claims priority to and is a divisional of U.S. patent application Ser. No. 11/971,766, now U.S. Pat. No. 8,152,948, entitled "CONTOURED COMPOSITE PARTS" and filed Jan. 9, 2008 with the United States Patent and Trademark Office, the contents of which is hereby incorporated by reference.

BACKGROUND

Conventional stiffeners in aircraft and other devices often comprise hat-section stiffeners which are three flanged beams. However, these beams often may not be placed in highly contoured areas without wrinkling and/or buckling type issues. Costly repairs are often needed to provide added reinforcement to carry the required loads. Moreover, additional material such as repair plies may be needed which may increase the weight. Further, additional processing, inspection, and/or production steps may be required which may increase both the cost and time of production.

A composite part and/or method of manufacture is needed to decrease one or more problems associated with one or more of the existing composite parts and/or methods of manufacture.

SUMMARY

In one aspect of the disclosure, a composite part comprises a curved elongated section comprising a plurality of stacked reinforcement layers. The stacked reinforcement layers in the curved elongated section comprise at least one of non-continuous woven fabric and non-continuous reinforcement.

In another aspect of the disclosure, a method of manufacturing a composite part is disclosed. In one step, an elongated composite part is provided. The elongated composite part comprises stacked reinforcement layers comprising at least one of non-continuous woven fabric and non-continuous reinforcement. In another step, the elongated composite part is formed into a curved elongated section comprising at least one of the non-continuous woven fabric and the non-continuous reinforcement.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
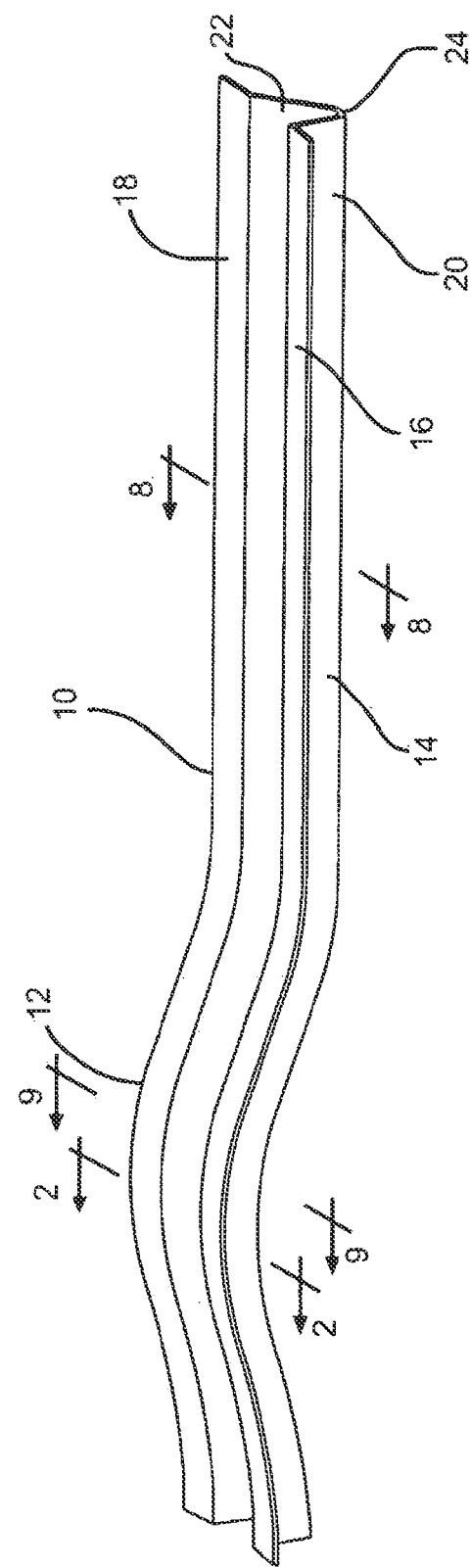
FIG. 1 shows a perspective view of one embodiment of a composite part which comprises a curved elongated section, which is curved in a Z plane, and a straight elongated section.

FIG. 1 shows a perspective view of one embodiment of a composite part 10 which comprises a curved elongated section 12, which is curved in a Z plane, and a straight elongated section 14. The composite part 10 may be made of stacked layers of reinforcement and may comprise an aircraft part, an aircraft frame, an aircraft stringer, or a non-aircraft part, device, or structure. The curved elongated section 12 may comprise flange members 16 and 18, web members 20 and 22, and cap member 24.

Figure 2:
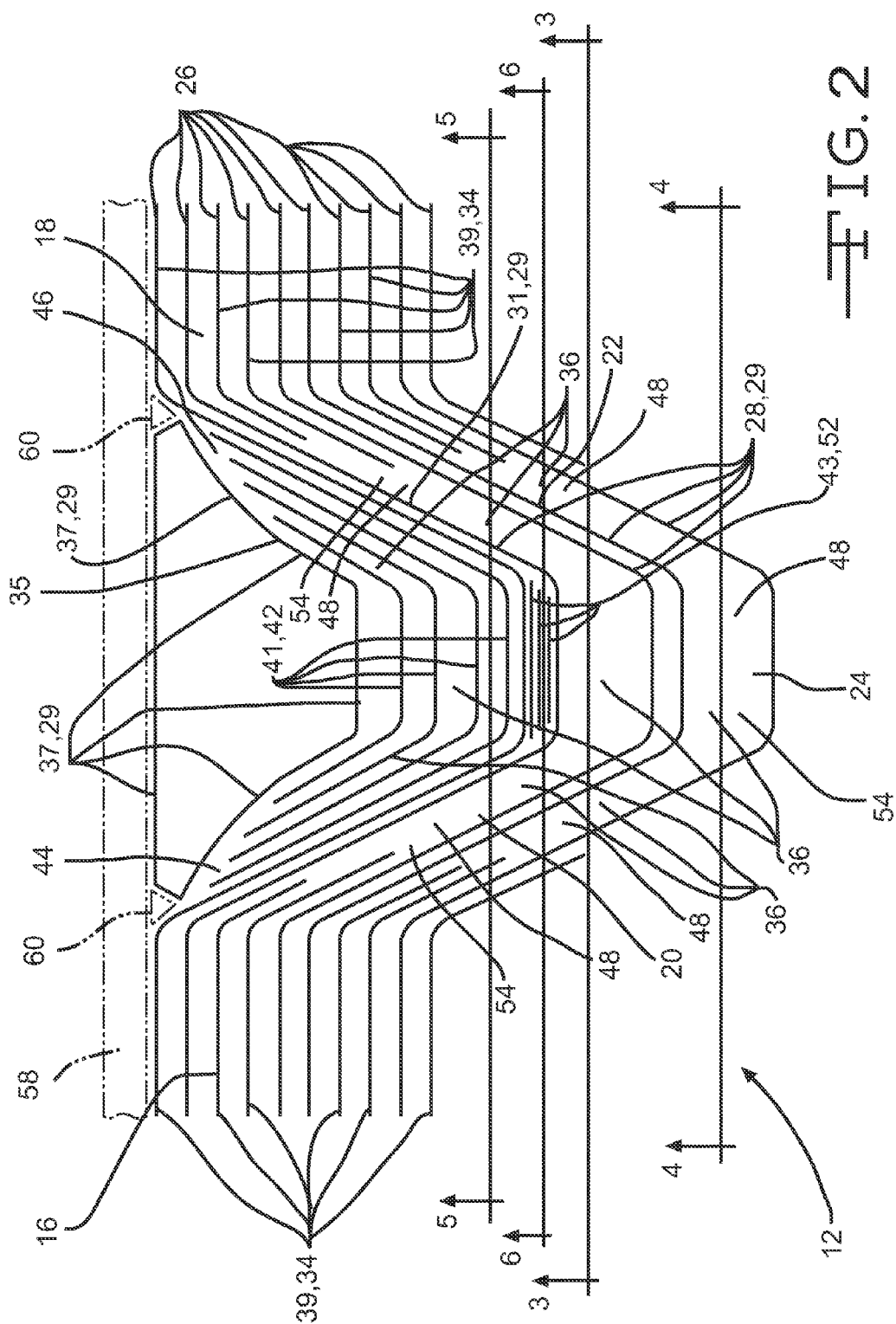
FIG. 2 shows a cross-section view through line 2-2 of the curved elongated section of the composite part embodiment of FIG. 1.
Figure 3:
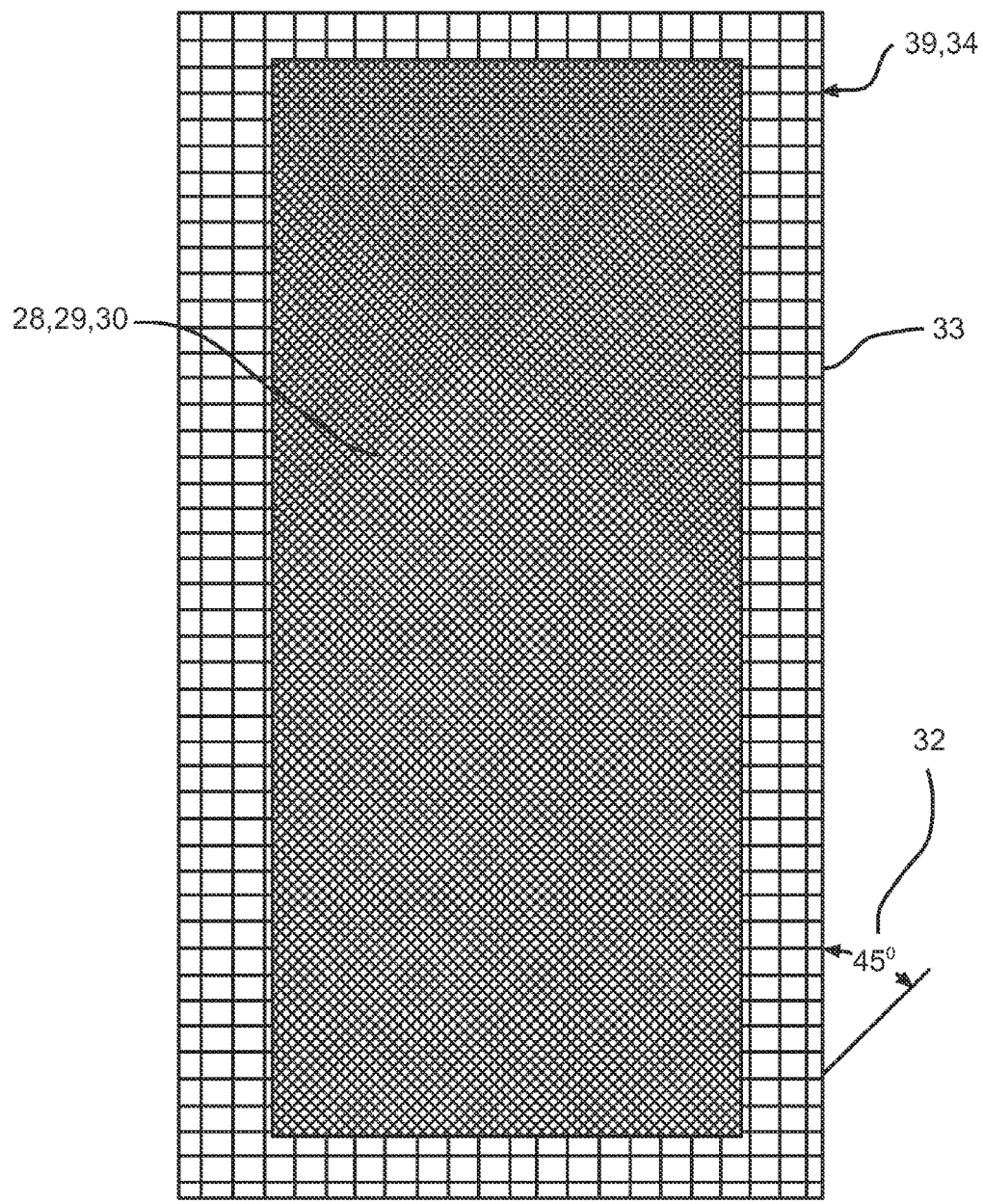
FIG. 3 shows a cross-section view through line 3-3 of 45° woven fabric of the cross-section view of the embodiment of FIG. 2 converted to a flat-pattern view.

FIG. 2 shows a cross-section view through line 2-2 of the curved elongated section 12 of the composite part 10 embodiment of FIG. 1. As shown, the curved elongated section 12 may comprise a plurality of stacked reinforcement layers 26 having different types/orientations of reinforcement. In other embodiments, the stacked reinforcement layers 26 may be made of varying materials. Some layers 28 of 45° (PX) woven fabric 29 may extend continuously from flange member 16 through web member 20, cap member 24, web member 22, and flange member 18. Other layers 31 of 45° (PX) woven fabric 29 may extend continuously from the web member 20, through the cap member 24, and to the web member 22, and may extend within the flange members 16 and 18. Still other layers 35 of 45° (PX) woven fabric may extend continuously around a perimeter 37 of the web member 20, the cap member 24, and the web member 22 without extending through the flange members 16 and 18. FIG. 3 shows a cross-section view through line 3-3 of some of the 45° woven fabric 29 of the cross-section view of the embodiment of FIG. 2 converted to a flat-pattern view. The 45° woven fabric 29 may comprise layers of reinforcement 30 at a 45° angle 32 relative to layers of reinforcement 33.

Figure 4:
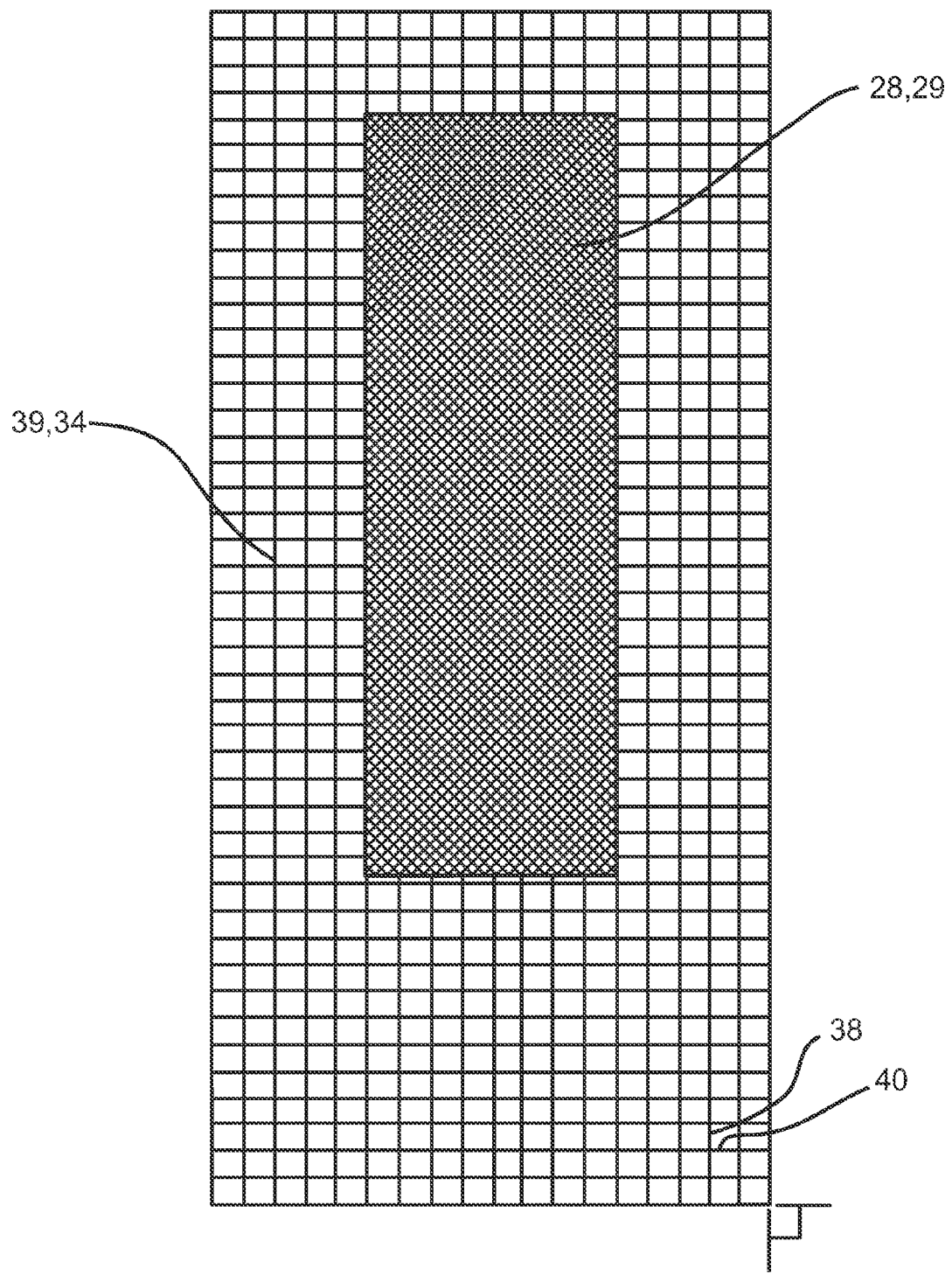
FIG. 4 shows a cross-section view through line 4-4 of 0/90° woven fabric of the cross-section view of the embodiment of FIG. 2 converted to a flat-pattern view.

As shown in FIG. 2, layers 39 of 0/90° (PW "plain weave") woven fabric 34 may extend non-continuously along the curved elongated section 12. The 0/90° woven fabric 34 may extend from flange member 16 only part-way through web member 20. The 0/90° woven fabric 34 may also extend from flange member 18 only part-way through web member 22. The 0/90° woven fabric 34 may not extend in cap member 24. There may be one or more windows 36 in the web member 20, the cap member 24, and the web member 22 where the 0/90° woven fabric 34 does not extend. These windows 36 may lessen and/or prevent the curved elongated section 12 from wrinkling. FIG. 4 shows a cross-section view through line 4-4 of the 0/90° woven fabric 34 of the cross-section view of the embodiment of FIG. 2 converted to a flat-pattern view. The 0/90° woven fabric 34 may comprise layers of reinforcement 38 which are perpendicular to layers of reinforcement 40.

Figure 5:
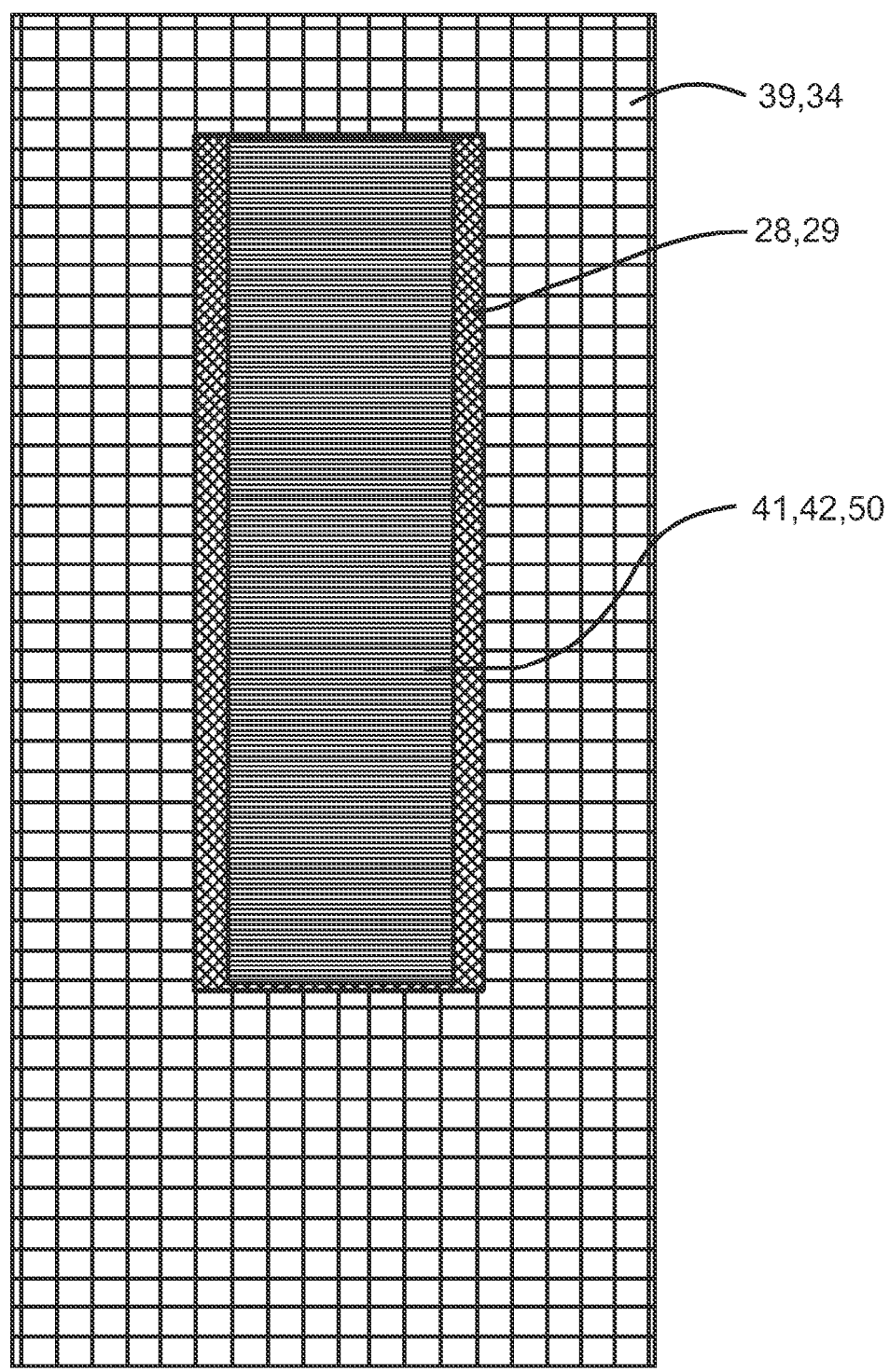
FIG. 5 shows a cross-section view through line 5-5 of 90°reinforcement of the cross-section view of the embodiment of FIG. 2 converted to a flat-pattern view.

As shown in FIG. 2, layers 41 of 90° reinforcement 42 may extend only part-way from web member 20 through cap member 24 and only part-way through web member 22. The 90° reinforcement 42 may not extend through flange members 16 or 18, and may not extend through portions 44 and 46 of web members 20 and 22. There may be one or more windows 48 in the web member 20, the cap member 24, and the web member 22 where the 90° reinforcement 42 does not extend. These windows 48 may lessen and/or prevent the curved elongated section 12 from wrinkling. FIG. 5 shows a cross-section view through line 5-5 of the 90° reinforcement 42 of the cross-section view of the embodiment of FIG. 2 converted to a flat-pattern view. The 90° reinforcement 42 may comprise parallel layers of reinforcement 50.

Figure 6:
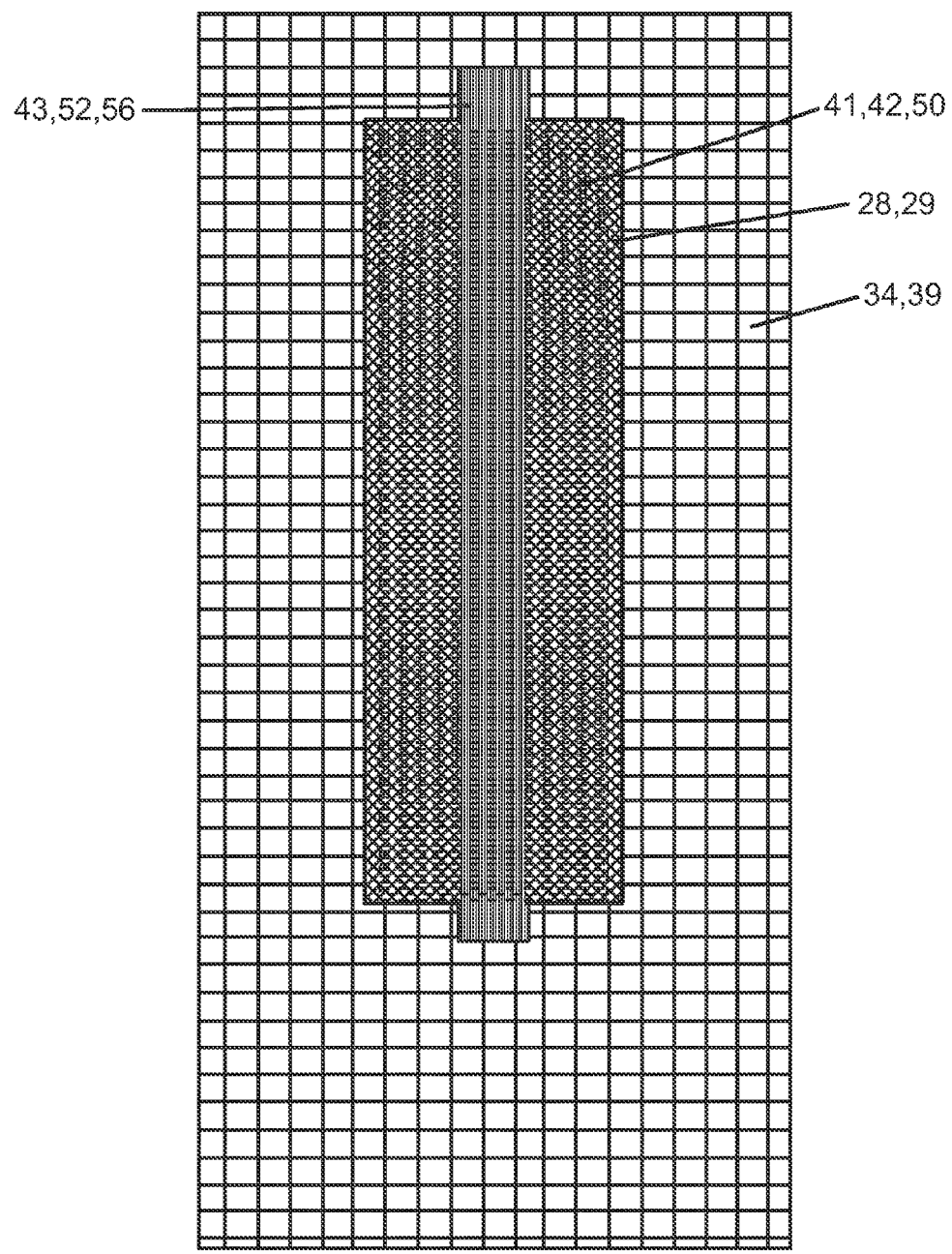
FIG. 6 shows a cross-section view through line 6-6 of 0° reinforcement of the cross-section view of the embodiment of FIG. 2 converted to a flat-pattern view.

As shown in FIG. 2, layers 43 of 0° reinforcement 52 may extend only part-way through the cap member 24. The layers of 0° reinforcement 52 may extend in the web members 20 and 22 but not the flange member 16 or 18. There may be one or more windows 54 in the web members 20 and 22 and the cap member 24 where the reinforcement does not extend. These windows 54 may lessen and/or prevent the curved elongated section 12 from wrinkling. FIG. 6 shows a cross-section view through line 6-6 of the 0° reinforcement 52 of the cross-section view of the embodiment of FIG. 2 converted to a flat-pattern view. The 0° reinforcement 52 may comprise parallel layers of reinforcement 56 which are oriented perpendicularly to the reinforcement 50 of FIG. 5.

As shown in FIG. 2, the curved elongated section 12 may be attached to a member 58 which may comprise an aircraft skin and/or other type of aircraft or non-aircraft part. A plurality of filler members 60 may be attached for extra support between the curved elongated section 12 and the member 58.

Figure 7:
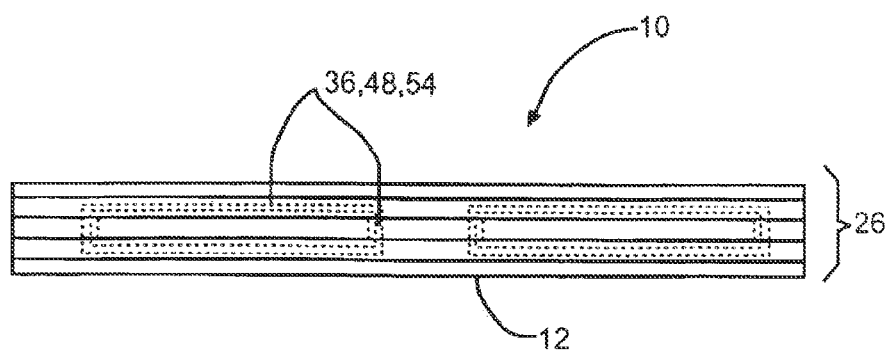
FIG. 7 shows a bottom plan view of the composite part of FIG. 1, with dashed lines used to show windows in the reinforcement layers of the curved elongated section.

FIG. 7 shows a bottom plan view of the composite part 10 of FIG. 1, with dashed lines used to show the respective windows 36, 48, and 54 in the reinforcement layers 26 of the curved elongated section 12. The windows 36, 48, and 54 may lessen and/or prevent the curved elongated section 12 from wrinkling.

Figure 8:
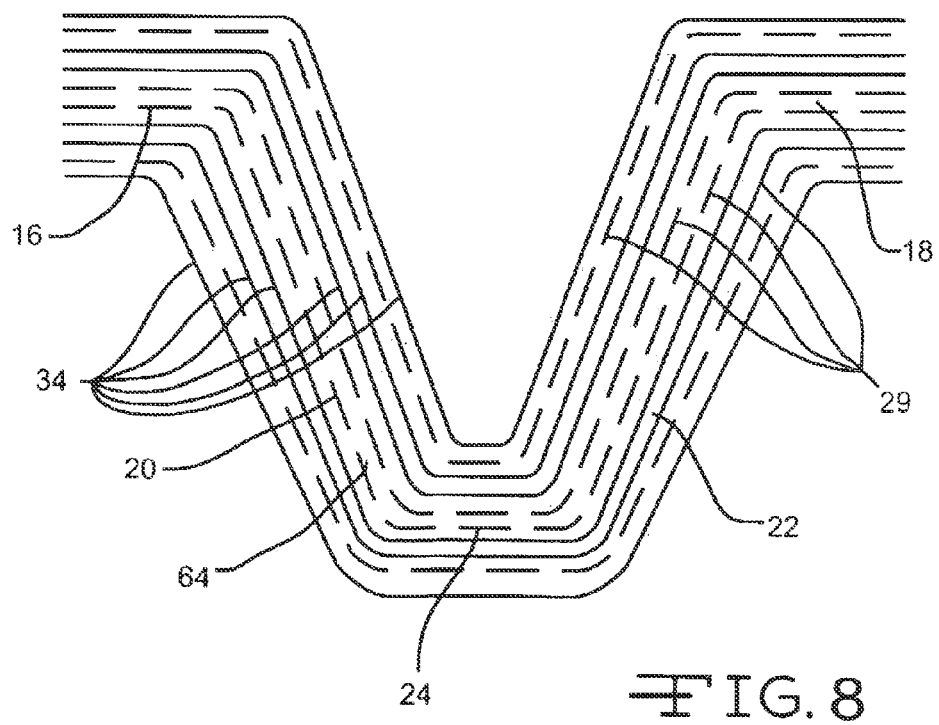
FIG. 8 shows a cross-section view through line 8-8 of the straight elongated section of the composite part embodiment of FIG. 1.

FIG. 8 shows a cross-section view through line 8-8 of the straight elongated section 14 of the composite part 10 embodiment of FIG. 1. As shown, the straight elongated section 14 may comprise a second plurality of stacked reinforcement layers 64. The second plurality of stacked reinforcement layers 64 may comprise layers of 45° (PX) woven fabric 29 which may extend continuously from flange member 16 through web member 20, cap member 24, web member 22, and flange member 18. The second plurality of stacked reinforcement layers 64 may further comprise layers of 0/90° (PW "plain weave") woven fabric 34 which may extend continuously from flange member 16 through web member 20, cap member 24, web member 22, and flange member 18.

Wrinkling may not be an issue in the straight elongated section 14, which may allow the layers of 45° (PX) woven fabric 29 and the layers of 0/90° (PW "plain weave") woven fabric 34 to extend continuously through the flange members 16 and 18, web members 20 and 22, and cap member 24 without using any windows in the reinforcement layers 64.

Figure 9:
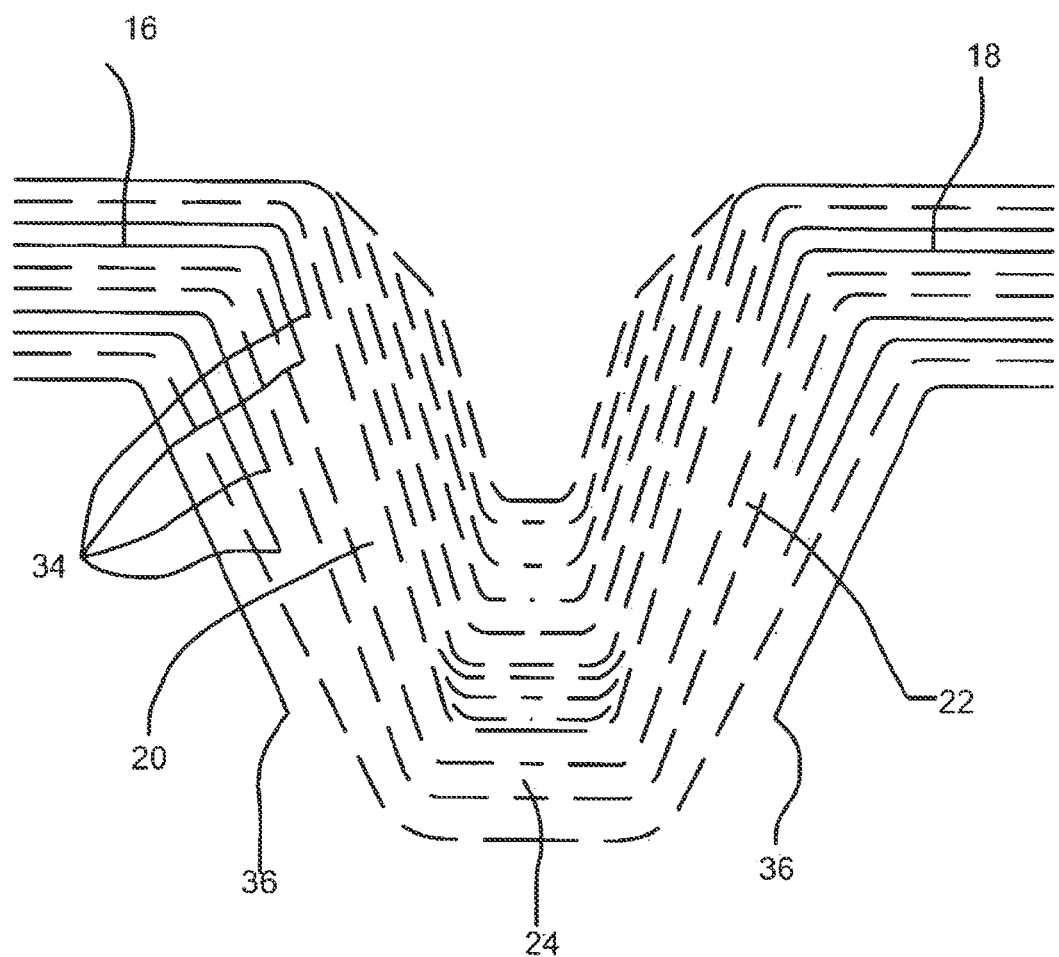
FIG. 9 shows another embodiment of a cross-section view through line 9-9 of the curved elongated section of the composite part embodiment of FIG. 1.

FIG. 9 shows another embodiment of a cross-section view through line 9-9 of the curved elongated section 12 of the composite part 10 embodiment of FIG. 1. The cross-section view of FIG. 9 may be identical to the cross-section view of FIG. 2 with the exception that the windows 36 where the 0/90° reinforcement does not extend may be expanded.

Figure 10:
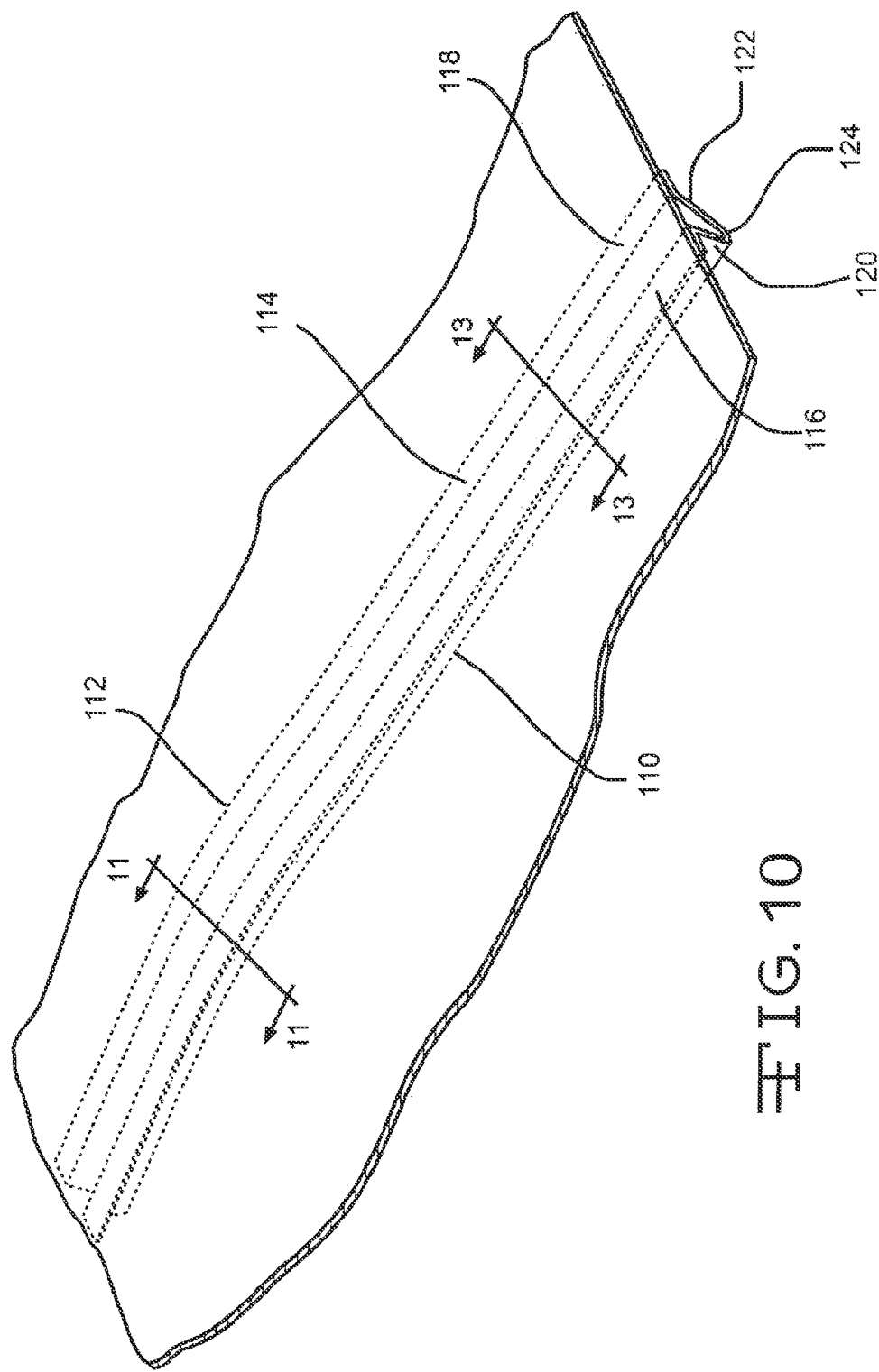
FIG. 10 shows a perspective view of one embodiment of a composite part which comprises a curved elongated section, which is curved in an X-Y plane, and a straight elongated section attached to a member.

FIG. 10 shows a perspective view of one embodiment of a composite part 110 which comprises a curved elongated section 112, which is curved in an X-Y plane, and a straight elongated section 114 attached to a member 158 which may comprise an aircraft skin and/or other type of aircraft or non-aircraft part. The composite part 110 may be made of stacked layers of reinforcement and may comprise an aircraft part, an aircraft frame, an aircraft stringer, or a non-aircraft part, device, or structure. The curved elongated section 112 may comprise flange members 116 and 118, web members 120 and 122, and cap member 124.

Figure 11:
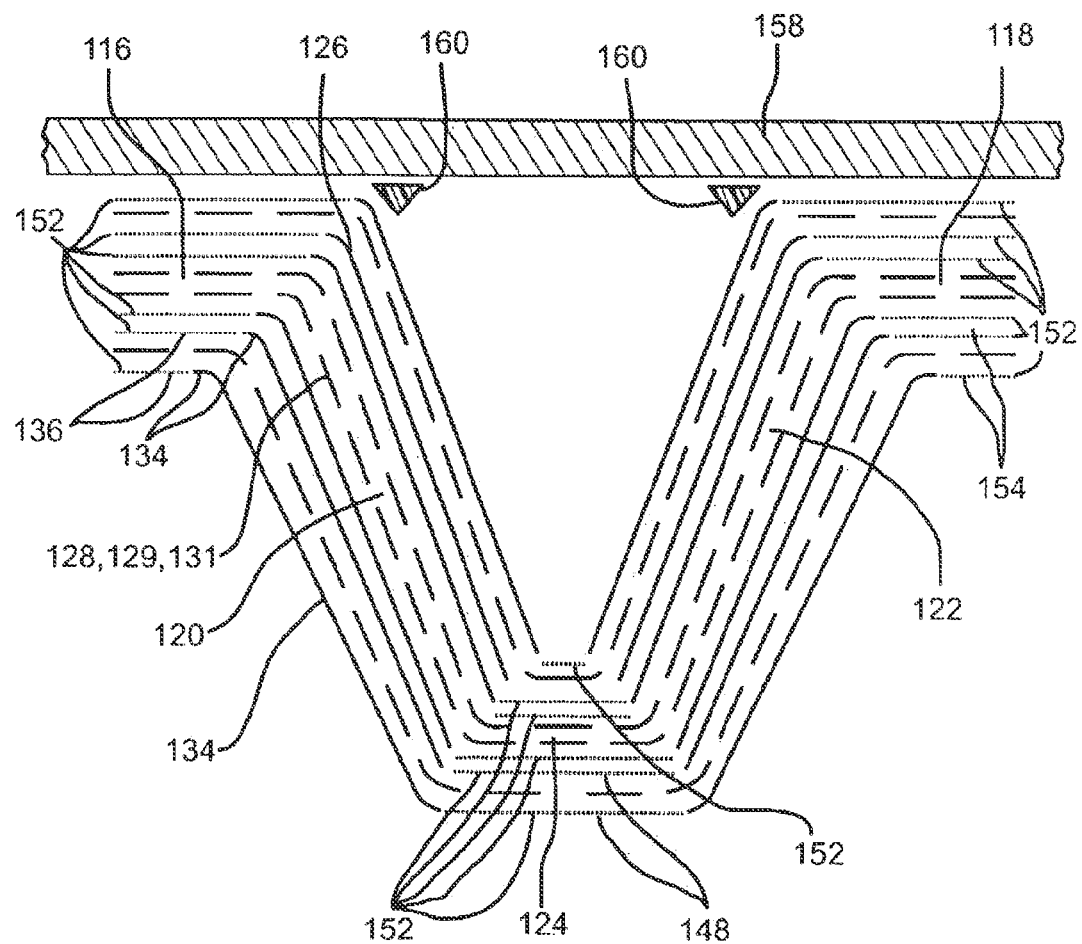
FIG. 11 shows a cross-section view through line 11-11 of the curved elongated section of the composite part embodiment of FIG. 10.

FIG. 11 shows a cross-section view through line 11-11 of the curved elongated section 112 of the composite part 110 embodiment of FIG. 10. As shown, the curved elongated section 112 may comprise a plurality of stacked reinforcement layers 126 having different types/orientations of reinforcement. The stacked reinforcement layers 126 may be made of one or more types of reinforcement. In other embodiments, the stacked reinforcement layers 126 may be made of varying materials. Some layers 128 of 45° (PX) woven fabric 129 may extend continuously from flange member 116 through web member 120, cap member 124, web member 122, and flange member 118.

As shown in FIG. 11, layers of 0/90° (PW "plain weave") woven fabric 134 may extend non-continuously along the curved elongated section 112. The 0/90° woven fabric 134 may extend only in the web members 120, and not extend in the flange members 116 and 118, or the cap member 124. In other embodiments, the 0/90° woven fabric 134 may extend only part-way within the flange members 116 and 118 without extending into the cap member 124. There may be one or more windows 136 in the flange members 116 and 118, and the cap member 124 where the 0/90° woven fabric 134 does not extend. These windows 136 may lessen and/or prevent the curved elongated section 112 from wrinkling.

As shown in FIG. 11, layers of non-continuous narrow strips or tows of 0° reinforcement 152 may extend from flange members 116 and 118 through the web members 120 and into the cap member 124 with a nominal gap between each strip or tow. These windows 154 may lessen and/or prevent the curved elongated section 112 from wrinkling.

As shown in FIG. 11, the curved elongated section 112 may be attached to a member 158 which may comprise an aircraft skin and/or other type of aircraft or non-aircraft part. A plurality of filler members 160 may be attached for extra support between the curved elongated section 112 and the member 158.

Figure 12:
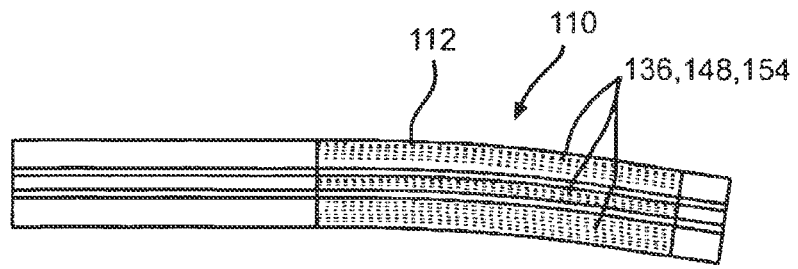
FIG. 12 shows a bottom plan view of the composite part of FIG. 10, with dashed lines used to show windows in the reinforcement layers of the curved elongated section.

FIG. 12 shows a bottom plan view of the composite part 110 of FIG. 10, with dashed lines used to show the non-continuous narrow strips or tows of 0° reinforcement within the windows 136, 148, and 154 in the 0/90° (PW "plain weave") woven fabric layers 134 of the curved elongated section 112. The windows 136, 148, and 154 may lessen and/or prevent the curved elongated section 112 from wrinkling.

Figure 13:
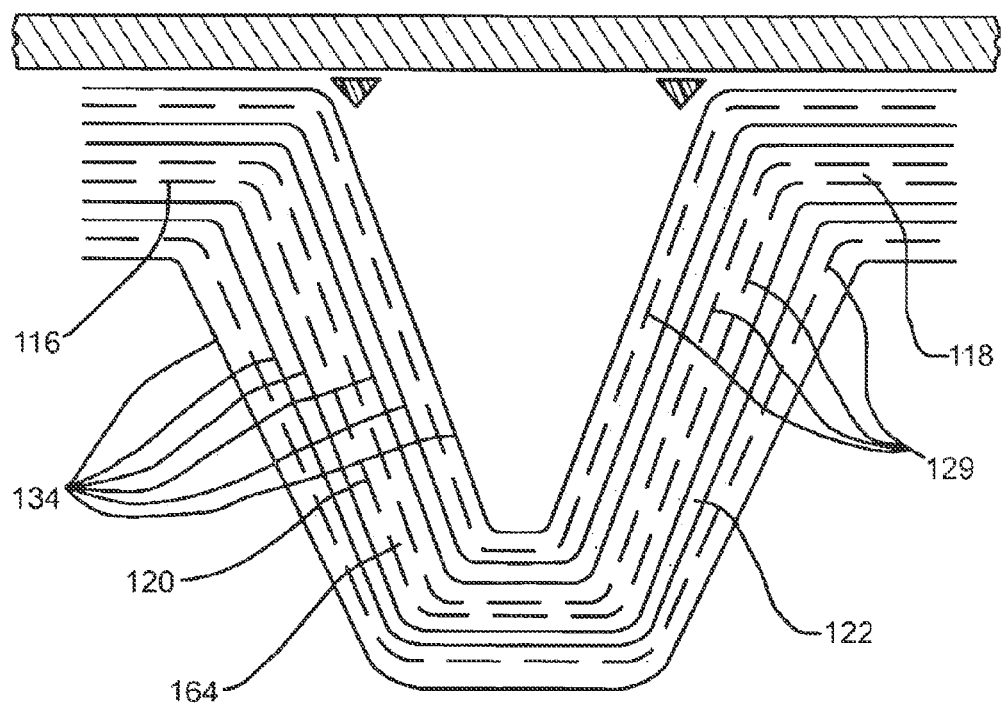
FIG. 13 shows a cross-section view through line 13-13 of the straight elongated section of the composite part embodiment of FIG. 10.

FIG. 13 shows a cross-section view through line 13-13 of the straight elongated section 114 of the composite part 110 embodiment of FIG. 10. As shown, the straight elongated section 114 may comprise a second plurality of stacked reinforcement layers 164. The second plurality of stacked reinforcement layers 164 may comprise layers of 45° (PX) woven fabric 129 which may extend continuously from flange member 116 through web member 120, cap member 124, web member 122, and flange member 118. The second plurality of stacked reinforcement layers 164 may further comprise layers of 0/90° (PW "plain weave") woven fabric 134 which may extend continuously from flange member 116 through web member 120, cap member 124, web member 122, and flange member 118. Wrinkling may not be an issue in the straight elongated section 114, which may allow the layers of 45° (PX) woven fabric 129 and the layers of 0/90° (PW "plain weave") woven fabric 134 to extend continuously through the flange members 116 and 118, web members 120 and 122, and cap member 124 without using any windows in the 0/90° (PW "plain weave") woven fabric layers 164.

Figure 14:
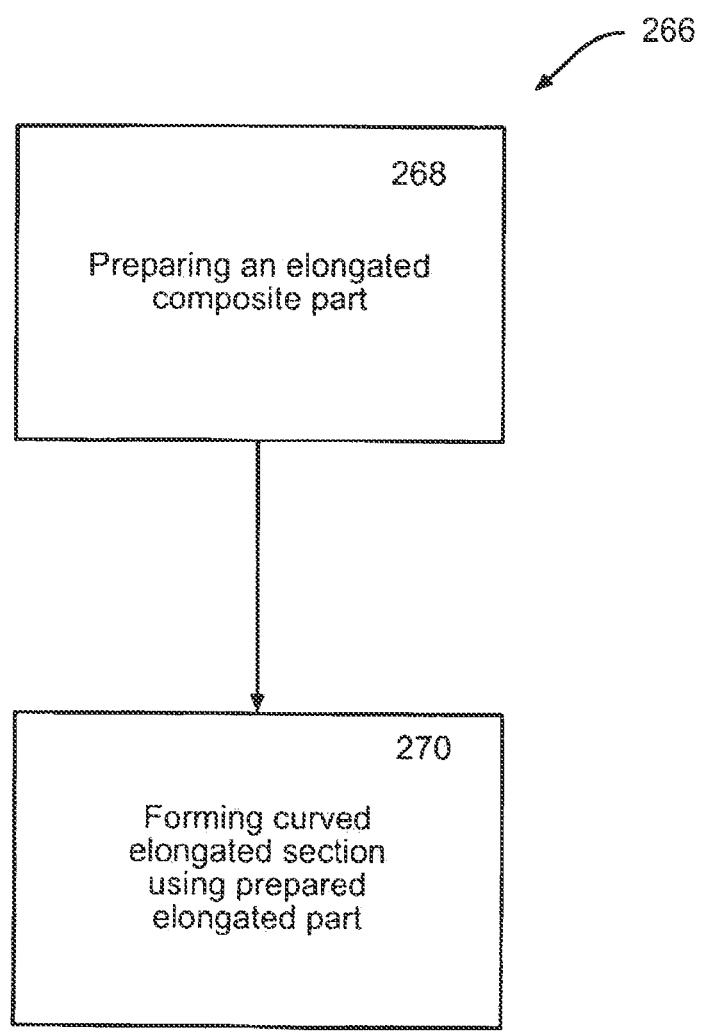
FIG. 14 shows one embodiment of a flowchart of a method of manufacturing a composite part.

FIG. 14 shows one embodiment of a flowchart 266 of a method of manufacturing a composite part 10/110. In one step 268, an elongated composite part 10/110 may be prepared/stacked. The prepared/stacked elongated composite part 10/110 may comprise stacking reinforcement layers 26/126 having at least one of non-continuous plain weave (PW) 0/90° woven fabric 34/134 and non-continuous 0° reinforcement 52/152, placing window plies around highly-contoured areas of the windows 36/48/54/136/148/154 and adding structural reinforcement plies into the windows 36/48/54/136/148/154. The stacked reinforcement layers 26/126 may be made of various reinforcements. In other embodiments, the stacked reinforcement layers 26/126 may be made of varying materials. The preparing step 268 may comprise preparing/stacking the plies of reinforcement into a flat charge the will comprise the elongated composite part 10/110 with straight/flat stacked reinforcement layers 26/126. The preparing step 268 may further comprise the straight elongated section 14/114 continuous plain weave (PW) 0/90° woven fabric 34/134 extending throughout the straight elongated section 14/114 and/or continuous 45° (PX) woven fabric 29/129 extending throughout the straight elongated section 14/114.

The preparing step 268 may utilize a cutting machine, a lay-up machine, and/or another type of machines to lay-up and/or cut the straight/flat stacked reinforcement layers 26/126. The preparing step 268 may additionally comprise preparing/stacking the elongated composite part 10/110 by stacking reinforcement layers 26/126 further comprising 45° (PX) woven fabric 29/129 and 90° reinforcement 42/142. The preparing step 268 may include programming a cutting machine, lay-up machine, and/or another type of machine to include a flat pattern for each of the stacked reinforcement layers 26/126 being stacked to include one or more windows 36/48/54/136/148/154 in the stacked reinforcement layers 26/126. The preparing step may further include interleaving a separator film between the reinforcement plies in the windows 36/48/54/136/148/154 manually and/or by using a machine.

In another step 270, the uncured, straight stacked reinforcement layers 26/126 of the prepared elongated composite part 10/110 may be formed into a curved elongated section 12/112. The forming step 270 may utilize a forming machine, a mold, and/or another type of forming device, structure, and/or process. In one embodiment, the forming step 270 may comprise one or more of the following: machine forming the elongated section 12/112 of the prepared elongated composite part 10/110 using the uncured, straight stacked reinforcement layers 26/126; placing the formed elongated section 12/112 into a cure mold; straightening flange members 16/18/116/118, and web members 20/22/120/122, as needed; locating and forming the window plies in the contoured sections; removing the separator film; and curing the curved elongated section 12/112 without wrinkles. The formed curved elongated section 12/112 may comprise one or more plies of the non-continuous plain weave (PW) 0/90° woven fabric 34/134 and the non-continuous 0° reinforcement 52/152. The forming step 270 may further comprise forming the uncured, straight stacked reinforcement layers 26/126 of the prepared elongated composite part 10/110 into a straight elongated section 14/114. The formed straight elongated section 14/114 may comprise continuous plain weave (PW) 0/90° woven fabric 34/134 extending throughout the straight elongated section 14/114 and/or continuous 45° (PX) woven fabric 29/129 extending throughout the straight elongated section 14/114.

In one embodiment, the preparing and forming steps 268 and 270 may comprise preparing and forming a composite part 10 comprising at least one of an aircraft part, an aircraft frame, and an aircraft stringer. In other embodiments, varying non-aircraft structures, devices, or parts may be prepared and formed.

In still other embodiments, the composite parts and the methods disclosed in the various embodiments of the instant disclosure may comprise and/or utilize woven fabric of any angular orientation, and/or reinforcement of any angular orientation. For instance, anywhere in this disclosure where a certain degree woven fabric, and/or a certain degree reinforcement is referred to, the degree of the woven fabric and/or the degree of the reinforcement may be varied.

One or more embodiments of the disclosure may reduce one or more problems of one or more of the existing composite parts and/or methods of manufacture. For instance, one or more embodiments of the disclosure may provide a composite part that can be placed in a highly contoured area with reduced and/or eliminated wrinkling and/or buckling type problems; may reduce costly repairs needed to add reinforcement to carry required loads; may reduce the need for additional reinforcing material thereby reducing cost and weight; may reduce the need for additional processing, inspection, and production steps; and/or may reduce one or more other types of problems.

It should be understood, of course, that the foregoing relates to exemplary embodiments of the disclosure and that modifications may be made without departing from the spirit and scope of the disclosure as set forth in the following claims.

The invention claimed is:

1. A composite part comprising:
   a curved elongated section comprising a plurality of stacked reinforcement layers of woven fabric comprising:
   a first continuous reinforcement layer of a first fabric;
   a second reinforcement layer of a second fabric, the second reinforcement layer forming a window comprising an opening,
   wherein the first continuous reinforcement layer is stacked against the second reinforcement layer so that the first continuous reinforcement layer covers the window of the second reinforcement layer.

2. The composite part of claim 1 wherein the first continuous reinforcement layer and the second reinforcement layer are curved at the covered window.

3. The composite part of claim 1 wherein the composite part comprises at least one of an aircraft part, an aircraft frame, or an aircraft stringer.

4. The composite part of claim 1 wherein each of the first continuous reinforcement layer and the second reinforcement layer comprise at least one of 0 degree reinforcement, 90 degree reinforcement, 0/90 degree woven fabric, 45 degree woven fabric, or a reinforcing fiber of another orientation.

5. The composite part of claim 4, wherein the first continuous reinforcement layer comprises a 45 degree woven fabric and the second reinforcement layer comprises at least one of 0 degree reinforcement, 90 degree reinforcement, or 0/90 degree woven fabric.

6. The composite part of claim 1 comprising a plurality of 45 degree woven fabric layers covering a plurality of windows in the second reinforcement layer comprising at least one of 0 degree reinforcement, 0/90 woven fabric, and 90 degree reinforcement.

7. The composite part of claim 1 wherein the curved elongated section comprises a plurality of flange members, a plurality of web members, and a cap member.

8. The composite part of claim 7 wherein the first continuous reinforcement layer comprises woven fabric oriented at other than 0/90 degrees which extends continuously between the flange members, web members, and cap member.

9. The composite part of claim 8 wherein the woven fabric oriented at other than 0/90 degrees is oriented at 45 degrees.

10. The composite part of claim 1 further comprising a straight elongated section comprising a second plurality of stacked reinforcement layers.

11. The composite part of claim 10 wherein both the straight elongated section and the curved elongated section comprise a plurality of flange members, a plurality of web members, and a cap member.

12. The composite part of claim 11 wherein the second plurality of stacked reinforcement layers comprises fabric extending continuously between the flange members, the web members, and the cap member.

13. The composite part of claim 12 wherein the second plurality of stacked reinforcement layers comprises at least one of 0 degree reinforcement extending continuously between the flange members, the web members, and the cap member, 0/90 degree fabric extending continuously between the flange members, the web members, and the cap member, or 45 degree fabric extending continuously between the flange members, the web members, and the cap member.

14. The composite part of claim 11 wherein the at least one window is disposed between the web members and the cap member.

15. A composite part comprising:
a curved elongated section comprising a plurality of stacked reinforcement layers of fabric,
wherein the stacked reinforcement layers in the curved elongated section comprise at least one of 0 degree reinforcement extending non-continuously through the curved elongated section, 90 degree reinforcement extending non-continuously through the curved elongated section, or 0/90 degree woven fabric extending non-continuously through the curved elongated section.

16. The composite part of claim 15, wherein the curved elongated section further comprises a stacked reinforcement layer comprising a 45 degree woven fabric.

17. The composite part of claim 15 wherein the composite part comprises a plurality of flange members, a plurality of web members, and a cap member.

18. The composite part of claim 17, wherein 45 degree woven fabric extends continuously between the flange members, the web members, and the cap member.

19. The composite part of claim 15 further comprising a straight elongated section comprising a second plurality of stacked reinforcement layers.

20. An aircraft comprising a composite part, the composite part comprising:
a curved elongated section comprising a plurality of stacked reinforcement layers of woven fabric comprising:
a first continuous reinforcement layer of a first fabric;
a second reinforcement layer of a second fabric, the second reinforcement layer forming a window comprising an opening,
wherein the first continuous reinforcement layer is stacked against the second reinforcement layer so that the first continuous reinforcement layer covers the window of the second reinforcement layer.

* * * * *